United States Patent
Smith et al.

(10) Patent No.: US 8,601,055 B2
(45) Date of Patent: Dec. 3, 2013

(54) DYNAMICALLY MANAGING A SOCIAL NETWORK GROUP

(75) Inventors: Andrew Bryan Smith, Morrisville, NC (US); Mark Douglas Weitzel, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 419 days.

(21) Appl. No.: 12/644,280

(22) Filed: Dec. 22, 2009

(65) Prior Publication Data
US 2011/0153740 A1 Jun. 23, 2011

(51) Int. Cl.
*G06F 15/16* (2006.01)

(52) U.S. Cl.
USPC ........... 709/204; 709/205; 709/206; 709/228; 707/10; 707/102

(58) Field of Classification Search
USPC .................. 709/204–206, 228; 707/10, 102
See application file for complete search history.

(56) References Cited

U.S. PATENT DOCUMENTS

| | | | |
|---|---|---|---|
| 2007/0156664 A1* | 7/2007 | Norton et al. ................ | 707/3 |
| 2008/0126113 A1 | 5/2008 | Manning | |
| 2008/0205295 A1 | 8/2008 | Saba | |
| 2008/0222308 A1 | 9/2008 | Abhyanker | |
| 2008/0243933 A1* | 10/2008 | Holtzman et al. ......... | 707/104.1 |
| 2008/0250322 A1 | 10/2008 | Szeto et al. | |
| 2008/0267091 A1* | 10/2008 | Parkkinen et al. ........... | 370/255 |
| 2008/0270615 A1 | 10/2008 | Centola et al. | |
| 2009/0028520 A1* | 1/2009 | Jain et al. ..................... | 386/83 |
| 2009/0037534 A1 | 2/2009 | Castro et al. | |
| 2009/0063991 A1* | 3/2009 | Baron et al. .................. | 715/751 |
| 2009/0157693 A1* | 6/2009 | Palahnuk ....................... | 707/10 |
| 2009/0164459 A1* | 6/2009 | Jennings et al. .............. | 707/5 |
| 2009/0216773 A1* | 8/2009 | Konopnicki ................... | 707/10 |
| 2009/0234876 A1 | 9/2009 | Schigel | |
| 2009/0249222 A1* | 10/2009 | Schmidt et al. ............... | 715/751 |
| 2009/0300518 A1 | 12/2009 | Mock et al. | |
| 2009/0305218 A1* | 12/2009 | Dozier et al. ................. | 434/362 |
| 2011/0016399 A1* | 1/2011 | Yasrebi et al. ................ | 715/734 |

FOREIGN PATENT DOCUMENTS

WO     0239300 A1    5/2002

\* cited by examiner

*Primary Examiner* — Wing F Chan
*Assistant Examiner* — Benjamin M Thieu
(74) *Attorney, Agent, or Firm* — Steven L. Nichols; Van Cott, Bagley, Cornwall & McCarthy P.C.

(57) ABSTRACT

A method for dynamically managing a social network group performed by a group management system having at least one physical processing apparatus includes receiving, with the group management system, data from a number of source providers over a computer network; identifying a basis for creating a new social network group from the data with the group management system; creating the new social network group with the group management system; and automatically inviting a number of members to join the new social network group with the group management system, each of the members being associated with the basis identified in the data for creating the new social network group.

18 Claims, 5 Drawing Sheets

DYNAMICALLY MANAGING A SOCIAL NETWORK GROUP

BACKGROUND

Aspects of the present invention relate in general to social network services, and more particularly, to creation and management of social network groups.

Online social network services bring individuals together in communities based on common access to the same online social network service. These online communities may facilitate communication among individual users of an online social network service based on connections established between the individual users. Such connections may be based on common interests, circumstances, friendships, family relationships, business relationships, and the like. Many online social network services allow users to enter personal information to establish a profile that is visible to other users of the online social network service. A user's profile may be made public or be limited to certain people within the online community as approved by the user.

Most online social network services also allow users to organize themselves into groups. Such groups may be based on a theme common to members of the group, such as, for example, common interests, causes, or shared circumstances. In these groups messages and other data may be exchanged that is specifically applicable to or intended for the membership of that group. Some groups may allow any user to join, while other "private" groups may require that potential group members be invited by a moderator or existing member of the group. The organization of users into different groups within an online social network service may serve the purpose of focusing the exchange of information related to a specific topic or social cause to its intended recipients.

BRIEF SUMMARY

A method for dynamically managing a social network group performed by a group management system comprising at least one physical processing apparatus includes receiving, with the group management system, data from a number of source providers over a computer network; identifying a basis for creating a new social network group from the data with the group management system; creating the new social network group with the group management system; and automatically inviting a number of members to join the new social network group with the group management system, each of the members being associated with the basis identified in the data for creating the new social network group.

A computing system includes a processor and a memory communicatively coupled to the processor. The processor is configured to receive data from a number of source providers over a computer network; identify a basis for creating a new social network group from the data; create the new social network group; and automatically invite a number of members to join the new social network group, each of the members being associated with the basis identified in the data for creating the new social network group.

A computer program product for dynamically managing a social network group, the computer program product includes a computer readable storage medium having computer readable code embodied therewith. The computer readable program code includes computer readable program code configured to receive data from a number of source providers over a computer network; computer readable program code configured to identify a basis for creating a new social network group from the data; computer readable program code configured to create the new social network group; and computer readable program code configured to automatically invite a number of members to join the new social network group, each of the members being associated with the basis identified in the data for creating the new social network group.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses methods and systems for dynamically creating and managing an online social network group based on an analysis of data related to members of an online social network. According to certain illustrative embodiments, a group management system may receive data from a number of sources including news sites, blogs, social networks and specialized applications. This data may be analyzed according to a set of rules. If it is determined from the data and the set of rules that the formation of a new social network group may be beneficial, then the group management system may create a social network group and automatically invite potential members.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Throughout this specification and in the appended claims, the term "group management system" is to be broadly interpreted as a set of physical hardware operating according to software instructing the hardware to create or manage a social network group. The term "social network group" is to be broadly interpreted as a number of users or organizations forming an online community. The group may include users and organizations from the same social network service or multiple social network services.

Throughout this specification and in the appended claims, the term "rule-based system" is to be broadly interpreted as system for processing rule based logic. The term "logical reasoner" is to be broadly interpreted as a system or function which may process rules and make logical inferences therefrom based on observed or reported data. A logical reasoner may also determine if a conflict exists within a given set of rules.

Figure 1:
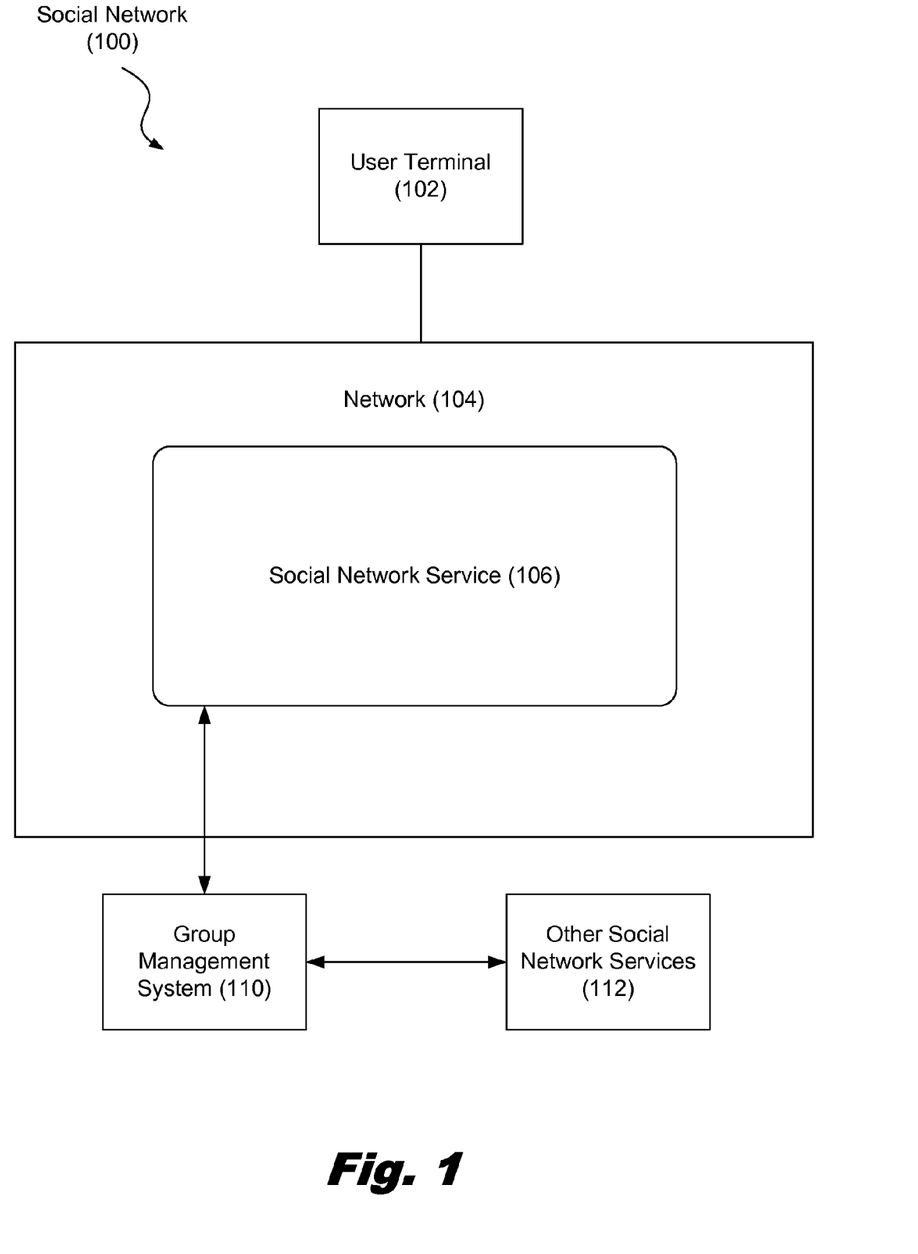
FIG. 1 is a diagram showing an illustrative overview of a social network, according to one embodiment of principles described herein.

FIG. 1 is a diagram showing an illustrative overview of an online social network (100). According to certain illustrative embodiments, a social network service (106) is available through a user terminal (102) over a computer network (104). A group management system (110) may interface with the social network service (106) as well as other social network services (112).

Social network services (106) are often available over a network (104) such as the internet. A user may access a social network service through a user terminal (102). A user terminal (102) may include, but is not limited to, a desktop computer, a laptop computer, and a mobile computing device such as a PDA or a cell-phone.

As mentioned above, the group management system (110) may be configured to interface with a number of social network services (112) to collect data and form groups within those social networks. The group management system may be a standalone application stored on a server connected to the network (104). In some embodiments, the group management system may be integrated with a particular social network service.

Figure 2:
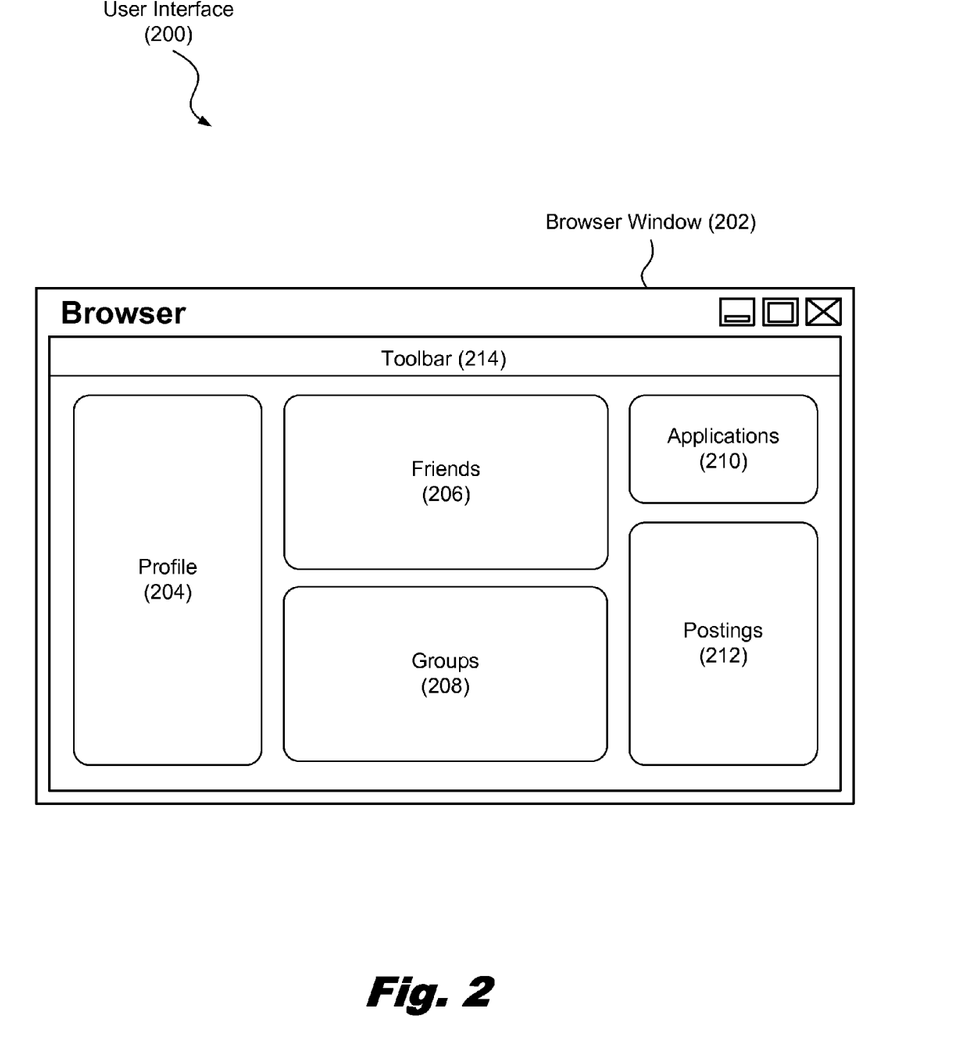
FIG. 2 is a diagram showing an illustrative user interface for a social network service, according to one embodiment of principles described herein.

FIG. 2 is a diagram showing an illustrative user interface (200) for a social network service. According to certain illustrative embodiments, a browser window (202) may display a toolbar (214), a profile (204) section, a friends (206) section, a groups (208) section, an applications (210) section, and a postings (212) section.

A typical web browser (202) allows a user to interact with various applications over the Internet. One such type of application is a social network service. Through the web browser (202), a user may create and access an account with a social network service. The web browser may then display to the user a number of features associated with the service. The web browser may also allow the user to send information to the service.

A typical social network service allows a user to enter information about them to create a profile (204). The profile (204) may then be displayed when a user accesses the service. The profile (204) information may include, but is not limited to, contact information, interests, hobbies, career, and other personal items. As mentioned above, this information may be either public or limited to a select few as determined by the user.

A social network service generally allows a user to make connections with other users. The other users may include friends, family, coworkers and various professional relationships. These connections are often classified as friends (206). Through the web browser (202), a user may scan through the profiles of their friends (206). They may be able to view photos, comments, and status updates associated with those friends (206).

The web browser (202) may be configured to display a number of groups (208) which a user has chosen to join. Groups may be created by users for a variety of purposes. As mentioned above, groups may be formed based on situations or events. The group section may display groups which have been dynamically created by a group management system in response to a determination that a situation or event may benefit from a social network group. Through the group (208) section, a user may interact with a particular group and receive updates and instructions relating to his or her position within the group.

The web browser (202) may also display a number of applications (210) associated with the social network service. These applications (210) may either be created by the social network service developers or third party developers. These applications may include games and other services which social network users may find beneficial or enjoyable. In certain embodiments, an application (210) may be used to gather specific information and provide the information to a group management system. For example, if a user makes a note somewhere within the social network application saying "going to the doctor," an application may send that data to the group management system. The group management system may then determine that it may be beneficial to create a group which may include the patient, a primary care doctor, specialized doctors, a nurse, and a health insurance agent.

A typical social network sites allows users to make postings (212) of notes and blogs and other information. These postings (212) may be public or limited to specific friends associated with a user. As with other information associated with a user, text within the postings (212) may be provided to the group management system to determine if it may be beneficial to automatically create a social network group.

Figure 3:
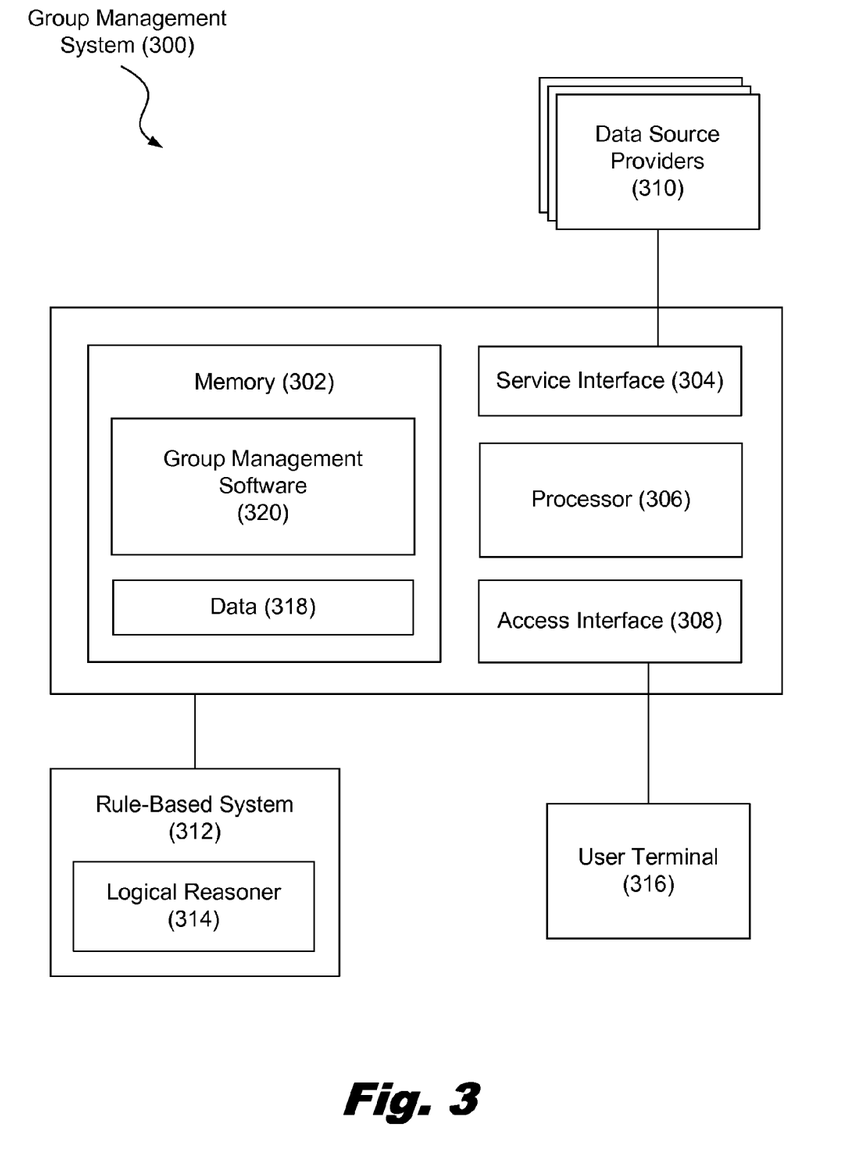
FIG. 3 is a diagram showing an illustrative group management system, according to one embodiment of principles described herein.

Referring now to the figures, FIG. 3 is a diagram showing an illustrative group management system. According to certain illustrative embodiments, the group management system (300) may include a memory (302) having group management software (320) and data (318) stored thereon. The group management system (300) may further include a service interface (304) for interfacing with data source providers (310), a processor (306), and an access interface (308) allowing users to access the system. The group management system may also make use of a rule-based system (312) and a logical reasoner (314).

Many types of memory (302) exist and may be used in conjunction with the group management system (300). Some types of memory, such as hard disk drives, optical disc drives, solid state drives, and other nonvolatile memory, are optimized for storage. Other types of memory, including volatile memory such as Random Access Memory (RAM), are optimized for speed and can be used as "working memory" for providing executable instructions to the processor (306). The various forms of memory may store information in the form of data (318) and software (320). In certain embodiments, the memory (302) includes both nonvolatile and volatile memory. Software (320) may be defined as a set of instructions for the processor (306) which are stored in some form of memory (302). The software may be configured to instruct the processor (306) to perform functions relating to the management of social network groups.

The service interface (304) may provide the group management system (300) with access to various data source providers (310) through a network such as the Internet. Data source providers (310) may include, but are not limited to, social network services, online news services, a conventional blogging service or website, a microblogging service or website (e.g., Twitter), and customized source providers. The group management system (300) may be configured to retrieve specific data (318) from these data source providers (310) to use for analysis in managing one or more social network groups.

The access interface (308) may be used to provide a user or administrator with access to the group management system (300). A user or administrator may access the system through a user terminal (316). In certain embodiments, the user terminal (316) may include peripheral input or output devices communicatively coupled to the processor (306). Additionally or alternatively, the user terminal (316) may include a number of separate computing devices communicatively coupled to the processor (306) through a network. Such separate computing devices may include, but are not limited to, personal desktop computers, portable computers, and a mobile hand-held devices such as cellular phones and Personal Digital Assistants (PDAs).

The rule-based system (312) may provide a means to store and interpret data. A rule-based system (312) may be configured to work with a set of rules. The rules may include a number of axioms and conditional statements. The rule-based system (312) may employ a logical reasoner (314) to make logical inferences from a given set of axioms according to the defined set of rules. In certain embodiments, the group management system (300) may be configured to translate the retrieved data (318) from the data source providers (310) into a format able to be processed by the logical reasoner (314) such that the logical reasoner (314) may process the translated data (318) with a set of rules and policies to determine whether a basis exists in the retrieved data (318) for creating a new social network group and to create the new social network group where such a basis exists. In certain embodiments, the rules and policies applied by the logical reasoner (314) to the data (318) may be specific to a type of basis found in the data (318) for creating a new social network group.

A logical reasoner (314) is a software entity often configured to use first-order logic. In certain embodiments, a rule-based system (312) may employ a logical reasoner (314) which uses description logic. Description logic is a knowledge based language which is used to describe logical statements in a clear and consistent manner.

The present example illustrates the rule-based system (312) as external to and communicatively coupled to the processor (306) of the group management system (300). Nevertheless, it should be understood that in certain embodiments some or all of the functionality of the rule-based system may be performed by the same processor (306) executing the group management software (320). For example, in certain embodiments the rule-based system functionality may be incorporated directly into the group management software (320) such that the processor (306), by executing the group management software (320), also implements the rule-based system (312) for the purposes of the social network group management.

Figure 4:
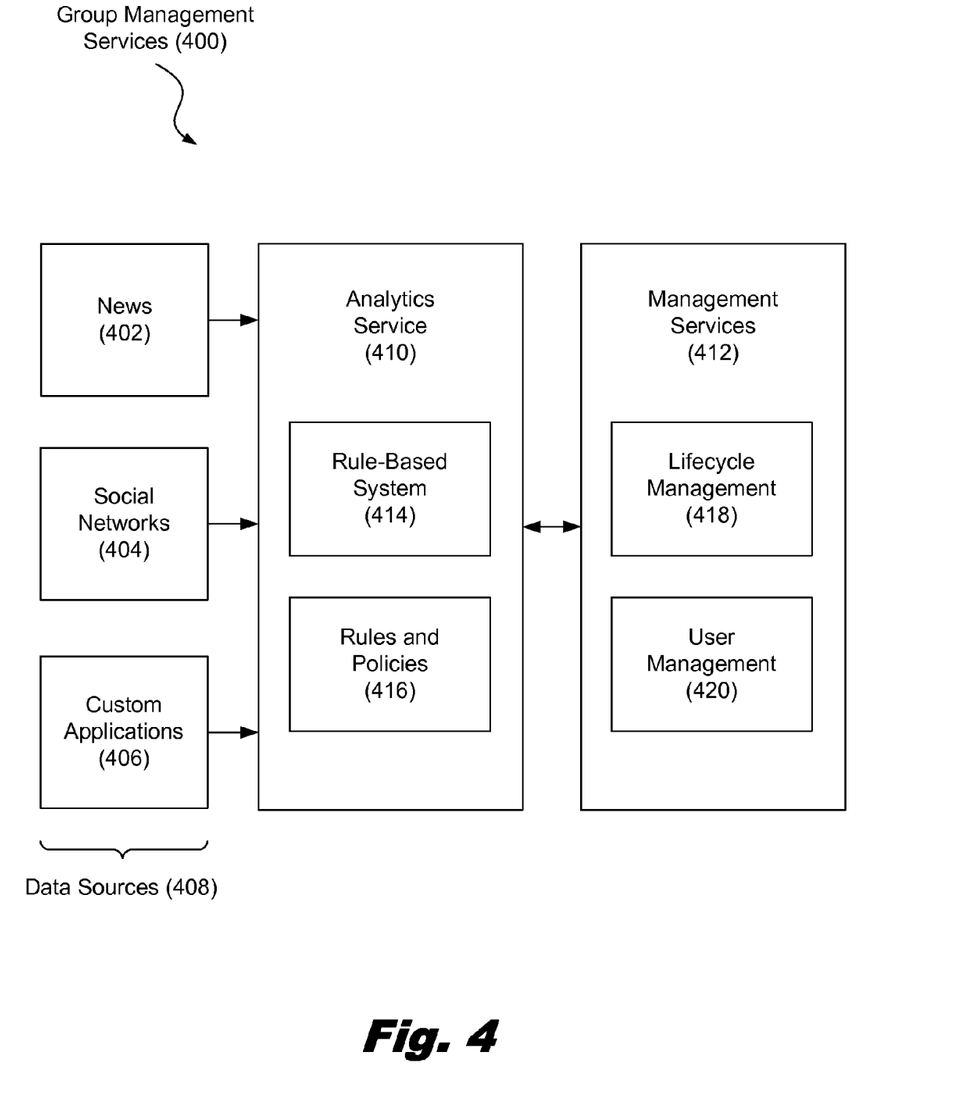
FIG. 4 is a diagram showing illustrative group management services, according to one embodiment of principles described herein.

FIG. 4 is a diagram showing illustrative group management services (400). According to certain illustrative embodiments, these services (400) may include an analytics service (410) and a management service (412). The analytics service (410) may employ a rule-based system (414) which uses a set of rules and policies (416). The analytics service (410) may receive data from data sources (408) such as news sites (402), social networks (404), and customized applications (406). The management service (412) may include lifecycle management (418) and user management (420).

An analytics service (410) associated with a group management system may be configured to analyze data received from a variety of sources. One example of a source of data may be a website for a news organization. For example, the group management system may receive Really Simple Syndication (RSS) feeds from a news site. The text from the RSS feeds may then be searched. In certain embodiments, the system may be configured to identify key words to determine if the news article relates to a specific event or situation in which a social network group may be beneficial.

In certain embodiments, the group management system may receive information from a number of social network sites (404). Several social networks (404) are available which allow users to network and communicate with friends, family, and coworkers. These social network sites (404) may include, but are not limited to, Facebook, MySpace, and Twitter. Such social network sites (404) allow users to announce their status either publicly or to only those they have selected as friends. A friend on a social network site (404) may not be limited to the traditional definition of friend. A friend on a social network site (404) may include family, coworkers, and professional relationships.

In some embodiments, the group management system may be configured to receive and analyze data from customized applications (406). Customized applications (406) may include any type of service which provides data. In some embodiments, an application may be designed specifically for collecting and providing data to the group management system.

After the analytics service (410) has received the data from various data sources (408), it may then begin to analyze the data and make determinations. As mentioned above, a rule-based system may be used to perform the analysis. A rule-based system is configured to take a set of given axioms and rules and make logical deductions. In a simple example, while searching the data received from the various data sources (408), the group management system may have determined that a natural disaster has occurred. A boolean variable "disaster" may then be set to "true." The rule-based system (414) may contain a rule saying that if "disaster=true", then "createGroup=true," where the Boolean variable, "createGroup" indicates the need for a group to be created. When processed by a logical reasoner, the rule-based system (414) may determine that because a natural disaster has occurred, a group should be created. As will be appreciated by one skilled in the relevant art, a complex set of variables, rules, and policies may determine when and how various groups are to be created.

In some embodiments, a different set of rules and policies (416) may be used for different types of situation. For example, a specific set of rules and policies (416) may be designed for emergency disaster situations. This specific set of rules and policies (416) may indicate how to form the group and invite volunteers to the group. In a further example, a set of rules and policies may be configured to form a group based on a determined professional relationship.

In addition to the analytics services (410) which determine when a group should be created, the group management system may include management services (412). The management services may include a variety of services required to maintain the group.

In certain embodiments, the management services (412) may include a lifecycle management service (418). A social network group which is based on a situation or event is typically needed for a specific range of time. After the situation or event associated with a group has passed, there may no longer be a need to maintain the group. The lifecycle management service (418) may be used to determine when a social network group is no longer needed. In one embodiment, the group management system may be configured to archive the data relating to a group after it has been determined that the group is no longer needed. For example, the lifecycle management service (418) may archive a group after detecting inactivity within the group for a predetermined amount of time.

In certain embodiments, a user management service (420) may be used to manage the various users associated with a created group. As a situation or event progresses, it may be beneficial to add or remove users from the group. For example, for a social network group based on a professional relationship, the user management service (420) may determine that an additional professional service would be helpful. As a result, a user belonging to the desired profession may then be invited to join the group.

Figure 5:
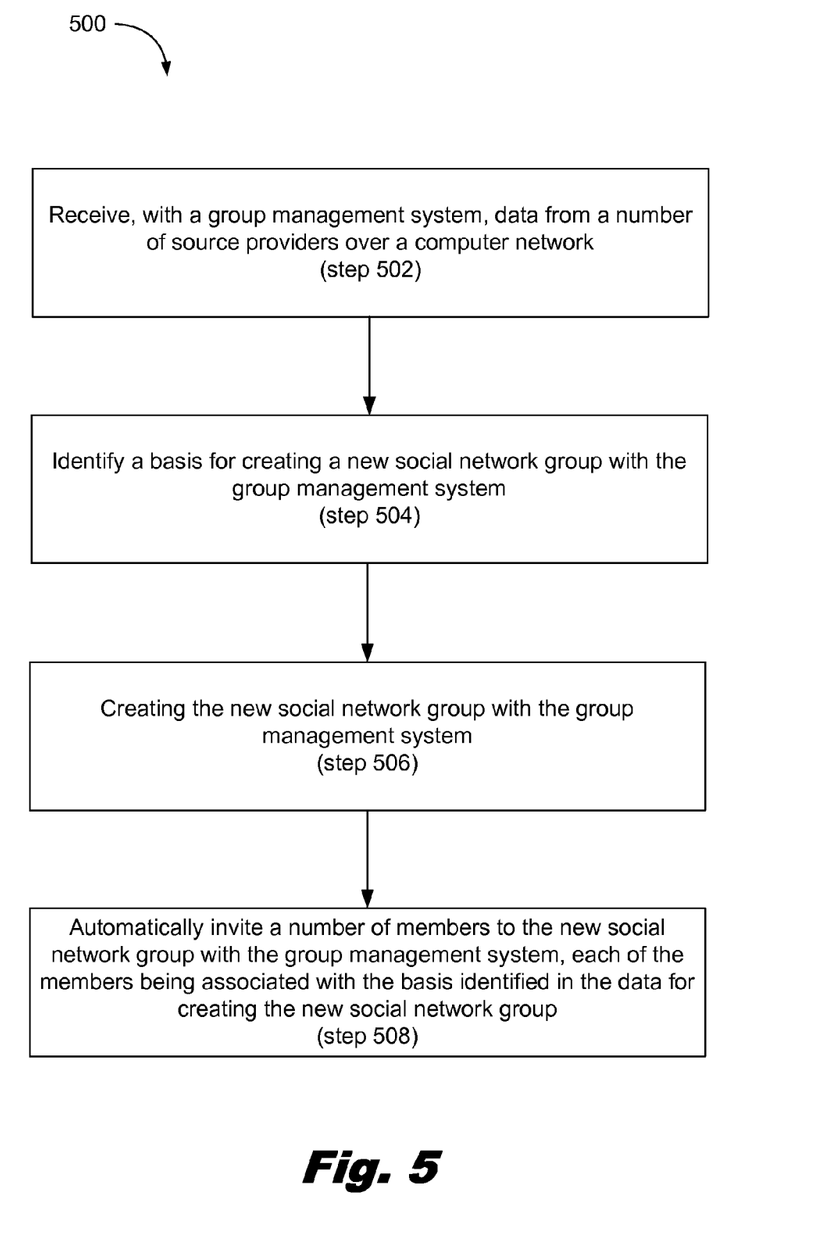
FIG. 5 is a flow chart showing an illustrative method for dynamic management of a situational social network group, according to one embodiment of principles described herein.

FIG. 5 is a flow chart showing an illustrative method (500) for dynamic management of a situational social network group. According to certain illustrative embodiments, a method for dynamically managing a social network group performed by a group management system that includes at least one physical processing apparatus includes receiving (step 502), with the group management system, data from a number of source providers over a computer network; identifying (step 504) a basis for creating a new social network group from the data with the group management system; creating (step 506) the new social network group with the group management system; and automatically inviting (step 508) a number of members to the new social network group with the group management system, each of the members being associated with the basis identified in the data for creating the new social network group.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for dynamically managing a social network group performed by a group management system comprising at least one physical processing apparatus, the method comprising:
    receiving, with said group management system, data from a number of source providers over a computer network;
    identifying a basis for creating a new social network group from said data with said group management system;
    creating said new social network group with said group management system;
    automatically inviting a number of members to join said new social network group with said group management system, each of said members being associated with said basis identified in said data for creating said new social network group;
    removing a number of said members from said new social network group as the basis for creating said new social network group changes; and
    archiving said social network group in response to a detected inactivity within said group for a predetermined amount of time.

2. The method of claim 1, further comprising translating said data into a format able to be processed by a logical reasoner in said group management system.

3. The method of claim 2, further comprising processing said translated data together with a set of rules and policies that is specific to a type of said basis for creating said new group in said social network.

4. The method of claim 1, in which said social network group comprises users associated with an online social network, said social network group being managed separately from said online social network.

5. The method of claim 1, in which said social network group comprises users associated with an online social network, said group management system being a component of said online social network.

6. The method of claim 1, further comprising consuming services from a number of alternate online social networks.

7. The method of claim 1, in which said number of source providers comprises at least one of: an online news service, an online social network associated with said social network group, an online social network separate not associated with said social network group, and a blogging service.

8. The method of claim 1, in which said data comprises at least one of: news articles, microblogging updates, social network status updates, blog postings, and public social network communications.

9. A computing system comprising:
    a processor; and
    a memory communicatively coupled to said processor;
    in which said processor:
        receives data from a number of source providers over a computer network;
        identifies a basis for creating a new social network group from said data;
        creates said new social network group;
        automatically invites a number of members to join said new social network group, each of said members being associated with said basis identified in said data for creating said new social network group;
        archives said social network group in response to a detected inactivity within said group for a predetermined amount of time; and
        removes a number of said members from said new social network group as the basis for creating said new social network group changes.

10. The system of claim 9, in which said computing system comprises a rule-based system; and said processor is further configured to translate said data into a format able to be processed by a logical reasoner implemented by said processor.

11. The system of claim 10, in which said rule-based system is configured to process said translated data together with a set of rules and policies that is specific to a type of said basis for creating said new group in said social network.

12. The system of claim 9, in which said social network group comprises users associated with an online social network, said social network group being managed separately from said online social network.

13. The system of claim 9, in which said social network group comprises users associated with an online social network, said computing system being a component of said online social network.

14. The system of claim 9, in which said social network group consumes services from a number of alternate online social networks.

15. The system of claim 9, in which said number of source providers comprises at least one of: an online news service, an online social network associated with said social network group, an online social network not associated with said social network group, and a blogging service.

16. The system of claim 9, in which said data comprises at least one of: news articles, microblogging updates, social network status updates, blog postings, and public social network communications.

17. A computer program product for dynamically managing a social network group, said computer program product comprising:
    a computer readable storage device having computer readable code embodied therewith, said computer readable program code comprising:
        computer readable program code to, when executed by a processor, receive data from a number of source providers over a computer network;
        computer readable program code to, when executed by a processor, identify a basis for creating a new social network group from said data;
        computer readable program code to, when executed by a processor, create said new social network group;

computer readable program code to, when executed by a process, automatically invite a number of members to join said new social network group, each of said members being associated with said basis identified in said data for creating said new social network group;

computer readable program code to, when executed by a processor, add and remove a number of said members to and from said new social network group as the basis for creating said new social network group changes; and computer readable program code to, when executed by a processor, determine, based on a detected inactivity, when the new social network group is no longer needed and archiving said new social network group after a threshold length of detected inactivity has occurred.

18. The computer program product of claim 17, said computer readable program code further comprises computer readable program code configured to translate said data into a format able to be processed by a logical reasoner.

* * * * *